UNITED STATES PATENT OFFICE.

EMILE MAERTENS, OF PROVIDENCE, RHODE ISLAND.

PROCESS OF CLEANING WOOL.

SPECIFICATION forming part of Letters Patent No. 698,207, dated April 22, 1902.

Application filed December 27, 1900. Serial No. 41,259. (No specimens.)

*To all whom it may concern:*

Be it known that I, EMILE MAERTENS, a citizen of the United States, residing at Providence, in the county of Providence and State of Rhode Island, have invented new and useful Improvements in the Art of Cleaning and Treating Wool and other Animal Fibers with Volatile Solvents and Various Aqueous Solutions, of which the following is a specification.

This invention relates more specifically to the treatment of the material with water or various aqueous solutions, or with both, after the fatty, oily, resinous, or other matters have been extracted therefrom with a volatile solvent and is designed for use in establishments where existing conditions or the nature of the materials treated make such a process possible or desirable.

The operation is carried on in apparatus such as described and shown in my United States Patents Nos. 630,293, 630,294, 630,295, 630,296, 660,757, and 660,758, the essential difference between the processes described therein and the present process consisting in the use of an aqueous acid solution or aqueous acid saline solution which is passed through the wool and from there into the storage-tanks, (which may contain aqueous solutions of potash salts and volatile solvent with or without wool-fat in solution,) either immediately after the extraction of the material with volatile solvent and while removing the residual solvent therefrom or following a preliminary passage of water or potash-salt solutions through the wool and the removal of the residual solvent thereby or after the passing of either water or potash-salt solutions, or of both, through the material and the removal of the residual solvent therefrom after its extraction with volatile solvents and according to the nature and condition of the material being treated, either for the purpose of reducing or destroying coloring principles or coloring-matters present on the fiber, for bleaching the same, for neutralizing or removing chemical impurities present in the wool, or for preparing the same for a special and subsequent process (other than a carbonizing process) whereof the treatment with any of the acid or saline solutions used may form a part or become beneficial thereto, or for the purpose of liberating the fatty acids from the potash salts present in the aqueous solutions and cause their absorption by the volatile solvent present, and thus also cause the separation of the latter from the acid saline solutions thus produced or used for the purpose.

I find sulfurous, sulfuric, oxalic, and hydrochloric acids, the chlorids and sulfates of heavy metals (such as aluminium sulfate and aluminium chlorid) and the hyposulfites, hydrosulfites, and bisulfites of the alkali metals (such as sodium hyposulfite, hydrosulfite, and bisulfite) suitable to my purpose. It is obvious that a mixture of any two or more of the above compounds may be used, if desired, and that solutions of other suitable acids or salts besides those named may be used also.

The strengths ($\frac{1}{2}°$ to $7°$ Baumé) and temperatures ($60°$ to $150°$ Fahrenheit) of the solutions may vary according to the nature and condition of the materials being treated, the time of treatment, (five minutes to two hours,) and the specific result sought, and therefore I do not limit myself to the ranges indicated.

When the materials, after having been degreased, contain no substantial quantities of natural soaps, (such as wool wastes, "scoured" wools, and certain classes of "washed" wools,) the treatment with acid or acid saline solutions immediately follows the extraction and is concurrent with the removal of the residual solvent therefrom; but when the material treated is appreciably laden with natural soaps I first remove the whole or the bulk of the latter with water or with solutions of potash salts and with water before applying the acid or acid saline solution, so as to prevent the liberated fatty matters from the decomposed soaps from being deposited on the wool.

After the material has been treated with an acid or acid saline solution and when the latter has been allowed to drain therefrom and when the bulk of the residual solution has been removed from the material also, either by pressure or otherwise, the still adhering residual solution may be allowed to remain on the fiber if its presence does not interfere with the subsequent process or processes to which the material is to be submitted or is beneficial thereto, or it may be removed therefrom by washing the latter with water, or the acidity of the adhering residual solution may first be neutralized by an aqueous alkaline or alkaline saline solution before the passing of water through the material, if the subsequent process to which it is to be submitted makes a neutral condition of the fiber desirable or imperative, and all according to the specific result it is desired to obtain.

Having described my invention, what I claim is—

1. In the art of treating wool which has been subjected to the action of a volatile solvent and which wool still retains some of said solvent, the process which consists in subjecting the wool to the action of water or suitable aqueous solutions and then to the action of a suitable acid or acid saline solution, for the purposes set forth.

2. In the art of treating wool which has been subjected to the action of a volatile solvent and which wool still retains some of said solvent, the process which consists in subjecting the wool to the action of water or suitable aqueous solutions, then treating the wool with an aqueous acid or acid saline solution and then removing the said acid or acid saline solution, substantially as described.

3. In the art of treating wool which has been subjected to the action of a volatile solvent and which wool still retains some of said solvent, the process which consists in subjecting the wool to the action of water or suitable aqueous solutions, then treating the wool with an aqueous acid or acid saline solution, then neutralizing said solution and then rinsing the wool, substantially as described.

4. In the art of treating wool which has been subjected to the action of a volatile solvent and which wool still retains some of said solvent, the process which consists in subjecting the wool to the action of water or suitable aqueous solutions then treating the wool with an aqueous acid or acid saline solution, then removing the bulk of said solution, then neutralizing the residual acid solution and then rinsing the wool, substantially as described.

5. In the art of treating wool which has been subjected to the action of a volatile solvent and which wool still retains some of said solvent, the process which consists in subjecting the wool to the action of water or suitable aqueous solutions, then treating the wool with an aqueous acid or acid saline solution, and then removing said acid or acid saline solution, substantially as described.

6. In the art of treating wool which has been subjected to the action of a volatile solvent and which wool still retains some of said solvent, the process which consists in subjecting the wool to the action of a suitable acid or acid saline solution, for the purpose set forth.

7. In the art of treating wool which has been subjected to the action of a volatile solvent and which wool still retains some of the said solvent, the process which consists in subjecting the wool to the action of a suitable acid or acid saline solution and then removing the acid or acid saline solution from the wool, substantially as described.

8. In the art of treating wool which has been subjected to the action of a volatile solvent and which wool still retains some of the said solvent, the process which consists in subjecting the wool to the action of a suitable acid or acid saline solution, and then neutralizing said solution, substantially as described.

9. In the art of treating wool which has been subjected to the action of a volatile solvent and which wool still retains some of the said solvent, the process which consists in subjecting the wool to the action of a suitable acid or acid saline solution, then treating the wool with a neutralizing solution, then washing the wool, substantially as described.

10. In the art of treating wool which has been subjected to the action of a volatile solvent and which wool still retains some of the said solvent, the process which consists in subjecting the wool to the action of a suitable acid or acid saline solution, then removing the bulk of said solution, then neutralizing the residual acid or acid saline solution and then rinsing the wool, substantially as described.

In testimony whereof I affix my signature in presence of two witnesses.

EMILE MAERTENS.

Witnesses:
M. I. FAY,
RUFUS S. MATTESON.